(12) United States Patent
Tang

(10) Patent No.: US 11,533,707 B2
(45) Date of Patent: Dec. 20, 2022

(54) PAGING TIME DETERMINATION METHOD AND DEVICE, AND COMPUTER STORAGE MEDIUM

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/893,749

(22) Filed: Jun. 5, 2020

(65) Prior Publication Data

US 2020/0305120 A1 Sep. 24, 2020

Related U.S. Application Data

(63) Continuation of application No. PCT/CN2017/115702, filed on Dec. 12, 2017.

(51) Int. Cl.
*H04W 68/02* (2009.01)

(52) U.S. Cl.
CPC ................... *H04W 68/02* (2013.01)

(58) Field of Classification Search
CPC .............. H04W 68/02; H04W 68/00
See application file for complete search history.

(56) References Cited

U.S. PATENT DOCUMENTS

| 2016/0234804 A1* | 8/2016 | Hu | H04W 68/02 |
| 2018/0317198 A1* | 11/2018 | Lee | H04L 5/0007 |
| 2019/0104498 A1* | 4/2019 | Jung | H04L 5/0053 |
| 2019/0357171 A1* | 11/2019 | Miao | H04B 7/0695 |
| 2020/0107294 A1* | 4/2020 | Ji | H04W 52/0229 |
| 2020/0107373 A1* | 4/2020 | Roy | H04L 5/0048 |

(Continued)

FOREIGN PATENT DOCUMENTS

| CN | 102378120 | 3/2012 |
| CN | 103442425 | 12/2013 |

(Continued)

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 14)," 3GPP TS 36.304, Sep. 2017, v14.4.0, 49 pages.

(Continued)

*Primary Examiner* — Charles T Shedrick
(74) *Attorney, Agent, or Firm* — Hodgson Russ LLP

(57) ABSTRACT

Disclosed are a paging time determination method and device, and a computer storage medium. The method includes: receiving, by a terminal, paging configuration information; determining, by the terminal, at least one type of at least one paging time unit corresponding to the terminal based on the paging configuration information; determining, by the terminal, a set of paging time units based on the at least one type of the at least one paging time unit; and receiving, by the terminal, a paging message on at least one paging time unit in the set of paging time units, wherein, one or more paging time units comprise at least one of a first type of a paging time unit or a second type of a paging time unit.

20 Claims, 8 Drawing Sheets

(56) References Cited

U.S. PATENT DOCUMENTS

| | | | |
|---|---|---|---|
| 2020/0187156 A1* | 6/2020 | Liu | H04W 68/02 |
| 2020/0280957 A1* | 9/2020 | Gao | H04W 68/02 |
| 2021/0185683 A1* | 6/2021 | Reial | H04W 72/0453 |

FOREIGN PATENT DOCUMENTS

| | | | | |
|---|---|---|---|---|
| CN | 105191356 A | | 12/2015 | |
| CN | 111148221 A | * | 5/2020 | H04W 16/14 |
| CN | 111937446 A | * | 11/2020 | H04W 24/10 |
| RU | 2559289 C2 | | 8/2015 | |
| WO | 2013149666 | | 10/2013 | |
| WO | 2017035300 A1 | | 3/2017 | |
| WO | 2017079574 | | 5/2017 | |
| WO | WO-2017198290 A1 | * | 11/2017 | H04L 27/2605 |
| WO | 2019099661 | | 5/2019 | |

OTHER PUBLICATIONS

WIPO, ISR for PCT/CN2017/115702, Aug. 23, 2018.

FIPS, Russia, First Office Action for RU2020122880, dated Jan. 29, 2021.

Intel Corporation, "Remaining system information delivery mechanisms," 3GPP TSG RAN WG1 Meeting #90, R1-1712526, Aug. 2017, 4 pages.

KIPO, Office Action for KR Application No. 10-2020-7019885, dated Jul. 19, 2021.

IPI, Office Action for IN Application No. 202027029428, dated Aug. 9, 2021.

EPO, Communication for EP Application No. 17934841.2, dated Oct. 13, 2021.

OPRO, "On NR paging design," 3GPP TSG RAN WG1 Meeting #91, R1-1720001, Nov. 2017.

JPO, Office Action for JP Application No. 2020-532029, dated Dec. 17, 2021.

KIPO, Office Action for KR Application No. 10-2020-7019885, dated Jan. 26, 2022.

IPOS, Office Action for SG Application No. 11202005581U, dated Feb. 21, 2022.

Ericsson, "Configuration of paging transmissions in multi-beam operation," 3GPP TSG-RAN WG2#100, Tdoc R2-1712527 (Revision of R2-1711369), Nov. 2017, 4 pages.

Huawei et al., "Multi-beam Paging for NR," 3GPP TSG RAN WG1 NR Ad-Hoc#2, R1-1709916, Jun. 2017, 3 pages.

Motorola Mobility et al., "NR paging design," 3GPP TSG RAN WG1 #91, R1-1720921, Nov. 2017, 3 pages.

EPO, Extended European Search Report for EP Application No. 17934841.2, dated Nov. 12, 2020.

JPO, Office Action for JP Application No. 2020-532029, dated Aug. 5, 2022.

CNIPA, Office Action for CN Application No. 202010524975.X, dated Oct. 9, 2022.

* cited by examiner

PAGING TIME DETERMINATION METHOD AND DEVICE, AND COMPUTER STORAGE MEDIUM

CROSS-REFERENCE TO RELATED APPLICATIONS

The present application is a continuation of International Application No. PCT/CN2017/115702, filed Dec. 12, 2017, the entire disclosure of which is incorporated herein by reference.

TECHNICAL FIELD

The present disclosure relates to the field of wireless communication, and more particularly, to a paging time determination method and device, and a computer storage medium.

BACKGROUND

In a Long Term Evolution (LTE) system, a network may send a paging message to a terminal (User Equipment, UE) in an idle state and a UE in a connection state. For the UE, it receives a paging message on a paging time unit in a Paging Frame (PF) in a Discontinuous Reception (DRX) cycle.

The UE determines a position of the paging time unit belonging to itself within one DRX cycle according to its UE ID, and then receives the paging message.

SUMMARY

Embodiments of the present disclosure provide a method and device for determining paging time, and a computer storage medium.

A method for determining paging time provided in an embodiment of the present disclosure includes:

receiving, by a terminal, paging configuration information;

determining, by the terminal, a type of a paging time unit corresponding to the terminal based on the paging configuration information;

determining, by the terminal, a set of paging time units based on the type of the paging time unit; and receiving, by the terminal, a paging message on at least one paging time unit in the set of paging time units, wherein, the paging time unit includes at least one of a first type of a paging time unit and a second type of a paging time unit.

In the embodiments of the present disclosure, determining, by the terminal, the type of the paging time unit corresponding to the terminal based on the paging configuration information includes:

obtaining, by the terminal, time-frequency resource information corresponding to the paging message from the paging configuration information; and determining, by the terminal, the type of the paging time unit corresponding to the terminal based on at least one of: the time-frequency resource information corresponding to the paging message, time-frequency resource information of a Synchronization Signal (SS) block, or preset bandwidth information.

In the embodiments of the present disclosure, determining, by the terminal, the type of paging time unit corresponding to the terminal based on the paging configuration information includes:

obtaining, by the terminal, paging indication information from the paging configuration information; and determining, by the terminal, the type of the paging time unit corresponding to the terminal based on the paging indication information.

In the embodiments of the present disclosure, determining, by the terminal, the type of paging time unit corresponding to the terminal based on at least one of the time-frequency resource information corresponding to the paging message, the time-frequency resource information of the SS block, or the preset bandwidth information includes:

determining, by the terminal based on at least one of the time-frequency resource information corresponding to the paging message, the time-frequency resource information of the SS block, or the preset bandwidth information, that the type of the paging time unit corresponding to the terminal is the first type of the paging time unit or the second type of the paging time unit;

or, determining, by the terminal based on at least one of the time-frequency resource information corresponding to the paging message, the time-frequency resource information of the SS block, or the preset bandwidth information, that the type of the paging time unit corresponding to the terminal is the first type of paging time unit and the second type of paging time unit.

In the embodiments of the present disclosure, the preset bandwidth information is minimum bandwidth information of the terminal, or the preset bandwidth information is bandwidth information corresponding to the terminal.

In the embodiments of the present disclosure, determining, by the terminal, the type of the paging time unit corresponding to the terminal based on the paging indication information includes:

determining, by the terminal based on the paging indication information, that the type of the paging time unit corresponding to the terminal is the first type of the paging time unit or the second type of the paging time unit; or determining, by the terminal based on the paging indication information, that the type of the paging time unit corresponding to the terminal is the first type of the paging time unit and the second type of the paging time unit.

In the embodiments of the present disclosure, the first type of the paging time unit corresponds to a first type of time-frequency resource, and the second type of the paging time unit corresponds to a second type of time-frequency resource.

In the embodiments of the present disclosure, a size of a time-frequency resource corresponding to the first type of time-frequency resource is different from a size of a time-frequency resource corresponding to the second type of time-frequency resource;

and/or, a multiplexing manner for the first type of time-frequency resource and a time-frequency resource of the SS block is different from a multiplexing manner for the second type of time-frequency resource and the time-frequency resource of the SS block.

In the embodiments of the present disclosure, the first type of the paging time unit being corresponding to the first type of time-frequency resource includes that:

on symbols of a nominal resource for SS block transmission, the time-frequency resource corresponding to the first type of the paging time unit and the nominal resource are frequency divided.

In the embodiments of the present disclosure, the second type of paging time unit being corresponding to the second type of time-frequency resource includes that:

on symbols of a nominal resource which is not for SS block transmission, the time-frequency resource corresponding to the second type of the paging time unit includes the time-frequency resource of the nominal resource.

In the embodiments of the present disclosure, the second type of the paging time unit being corresponding to the second type of time-frequency resource includes that:

the time-frequency resource corresponding to the second type of the paging time unit and the nominal resource are time divided.

In the embodiments of the present disclosure, the paging time unit includes a paging occasion (PO) or a part of time units in the PO.

A method for determining paging time provided in the embodiments of the present disclosure includes:

transmitting, by a network, paging configuration information, the paging configuration information being configured for determining a type of a paging time unit corresponding to a terminal; and transmitting, by the network, a paging message on at least one paging time unit in a set of paging time units corresponding to the paging configuration information, wherein, the paging time unit includes at least one of a first type of a paging time unit and a second type of a paging time unit.

In the embodiments of the present disclosure, the paging configuration information includes time-frequency resource information corresponding to the paging message.

In the embodiments of the present disclosure, the paging configuration information includes paging indication information.

In the embodiments of the present disclosure, the first type of the paging time unit corresponds to a first type of time-frequency resource, and the second type of paging time unit corresponds to a second type of time-frequency resource.

In the embodiments of the present disclosure, a size of a time-frequency resource corresponding to the first type of time-frequency resource is different from a size of a time-frequency resource corresponding to the second type of time-frequency resource;

and/or, a multiplexing manner for the first type of time-frequency resource and a time-frequency resource of the SS block is different from a multiplexing manner for the second type of time-frequency resource and the time-frequency resource of the SS block.

In the embodiments of the present disclosure, the first type of paging time unit being corresponding to the first type of time-frequency resource includes that:

on symbols of a nominal resource for SS block transmission, the time-frequency resource corresponding to the first type of the paging time unit and the nominal resource are frequency divided.

In the embodiments of the present disclosure, the second type of paging time unit being corresponding to the second type of time-frequency resource includes that:

on symbols of a nominal resource which is not for SS block transmission, the time-frequency resource corresponding to the second type of the paging time unit includes the time-frequency resource of the nominal resource.

In the embodiments of the present disclosure, the second type of the paging time unit being corresponding to the second type of time-frequency resource includes that:

the time-frequency resource corresponding to the second type of the paging time unit and the nominal resource are time divided.

In the embodiments of the present disclosure, the paging time unit includes a PO or a part of time units in the PO.

A device for determining paging time provided in the embodiments of the present disclosure includes:

a first receiving unit, configured to receive paging configuration information;

a first determining unit, configured to determine a type of a paging time unit corresponding to the terminal based on the paging configuration information a second determining unit, configured to determine a set of paging time units based on the type of the paging time unit; and a second receiving unit, configured to receive a paging message on at least one paging time unit in the set of paging time units, wherein, the paging time unit includes at least one of a first type of a paging time unit and a second type of a paging time unit.

In the embodiments of the present disclosure, the first determining unit is configured to obtain time-frequency resource information corresponding to the paging message from the paging configuration information; and determine the type of the paging time unit corresponding to the terminal based on at least one of: the time-frequency resource information corresponding to the paging message, time-frequency resource information of an SS block, or preset bandwidth information.

In the embodiments of the present disclosure, the first determining unit is configured to obtain paging indication information from the paging configuration information; and determine the type of the paging time unit corresponding to the terminal based on the paging indication information.

In the embodiments of the present disclosure, the first determining unit is configured to determine, based on at least one of the time-frequency resource information corresponding to the paging message, the time-frequency resource information of the SS block, or the preset bandwidth information, that the type of the paging time unit corresponding to the terminal is the first type of the paging time unit or the second type of the paging time unit; or determine, based on at least one of the time-frequency resource information corresponding to the paging message, the time-frequency resource information of the SS block, or the preset bandwidth information, that the type of the paging time unit corresponding to the terminal is the first type of the paging time unit and the second type of the paging time unit.

In the embodiments of the present disclosure, the preset bandwidth information is minimum bandwidth information of the terminal, or the preset bandwidth information is bandwidth information corresponding to the terminal.

In the embodiments of the present disclosure, the first determining unit is configured to determine, based on the paging indication information, that the type of the paging time unit corresponding to the terminal is the first type of the paging time unit or the second type of the paging time unit; or determine, based on the paging indication information, that the type of paging time unit corresponding to the terminal is the first type of paging time unit and the second type of paging time unit.

In the embodiment of the present disclosure, the first type of the paging time unit corresponds to a first type of time-frequency resource, and the second type of the paging time unit corresponds to a second type of time-frequency resource.

In the embodiments of the present disclosure, a size of a time-frequency resource corresponding to the first type of time-frequency resource is different from a size of a time-frequency resource corresponding to the second type of time-frequency resource;

and/or, a multiplexing manner for the first type of time-frequency resource and a time-frequency resource of the SS block is different from a multiplexing manner for the second type of time-frequency resource and the time-frequency resource of the SS block.

In the embodiments of the present disclosure, the first type of the paging time unit being corresponding to the first type of time-frequency resource includes that:

on symbols of a nominal resource for SS block transmission, the time-frequency resource corresponding to the first type of the paging time unit and the nominal resource are frequency divided.

In the embodiments of the present disclosure, the second type of paging time unit being corresponding to the second type of time-frequency resource includes that:

on symbols of a nominal resource which is not for SS block transmission, the time-frequency resource corresponding to the second type of the paging time unit includes the time-frequency resource of the nominal resource.

In the embodiments of the present disclosure, the second type of paging time unit being corresponding to the second type of time-frequency resource includes that:

the time-frequency resource corresponding to the second type of the paging time unit and the nominal resource are time divided.

In the embodiments of the present disclosure, the paging time unit includes a PO or a part of time units in the PO.

A device for determining paging time provided in the embodiments of the present disclosure includes:

a first transmitting unit, configured to transmit paging configuration information, the paging configuration information being configured for determining a type of a paging time unit corresponding to a terminal; and a second transmitting unit, configured to transmit a paging message on at least one paging time unit in a set of paging time units corresponding to the paging configuration information;

wherein, the paging time unit includes at least one of a first type of a paging time unit and a second type of a paging time unit.

In the embodiments of the present disclosure, the paging configuration information includes time-frequency resource information corresponding to the paging message.

In the embodiments of the present disclosure, the paging configuration information includes paging indication information.

In the embodiments of the present disclosure, the first type of the paging time unit corresponds to a first type of time-frequency resource, and the second type of the paging time unit corresponds to a second type of time-frequency resource.

In the embodiments of the present disclosure, a size of a time-frequency resource corresponding to the first type of time-frequency resource is different from a size of a time-frequency resource corresponding to the second type of time-frequency resource;

and/or, a multiplexing manner for the first type of time-frequency resource and a time-frequency resource of the SS block is different from a multiplexing manner for the second type of time-frequency resource and the time-frequency resource of the SS block.

In the embodiments of the present disclosure, the first type of the paging time unit being corresponding to the first type of time-frequency resource includes that:

on symbols of a nominal resource for SS block transmission, the time-frequency resource corresponding to the first type of the paging time unit and the nominal resource are frequency divided.

In the embodiments of the present disclosure, the second type of paging time unit being corresponding to the second type of time-frequency resource includes that:

on symbols of a nominal resource which is not for SS block transmission, the time-frequency resource corresponding to the second type of the paging time unit includes the time-frequency resource of the nominal resource.

In the embodiments of the present disclosure, the second type of paging time unit being corresponding to the second type of time-frequency resource includes that:

the time-frequency resource corresponding to the second type of the paging time unit and the nominal resource are time divided.

In the embodiments of the present disclosure, the paging time unit includes a PO or a part of time units in the PO.

A computer storage medium provided in the embodiments of the present disclosure has stored thereon computer-executable instructions which, when executed by a processor, implement the above method for determining paging time.

BRIEF DESCRIPTION OF THE DRAWINGS

The drawings described herein are used to provide a further understanding of the present disclosure and constitute a part of the present application. The exemplary embodiments of the present disclosure and the descriptions thereof are used to explain the present disclosure and do not constitute an improper limitation on the present disclosure. In the drawings.

DETAILED DESCRIPTION

In order to facilitate understanding of the technical solution of the embodiments of the present disclosure, certain technologies involved in the embodiments of the present disclosure are explained below.

1) Beams in 5G

Figure 1:
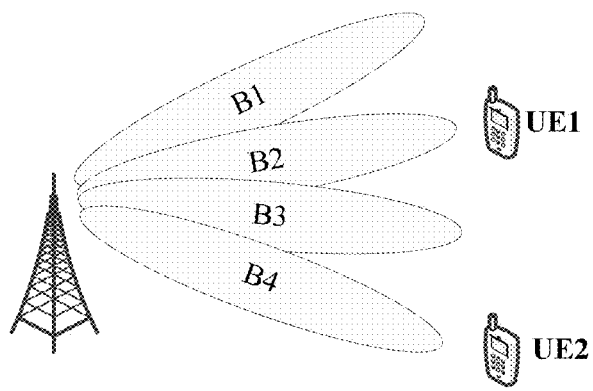
FIG. 1 is a schematic diagram of a base station sending a wireless signal through a beam.

Because the frequency band used in the 5G system is higher than that of the LTE system, a path loss of the wireless signal transmission of the 5G system is also larger than that of the LTE system, resulting in a smaller coverage of the wireless signal of the 5G system. As such, in the 5G system, a beamforming technology is used by a multi-antenna system of the base station to form beams so as to improve a gain of the wireless signal, thereby compensating for the path loss. In the beamforming technology, the beams are directional, and a narrow beam may only cover a partial region of the cell, and may not cover the entire region of the cell. As shown in FIG. 1, the base station can send signals through four beams in different directions (B1, B2, B3, and B4). For example, for the beam B2, it can only cover UE1 and cannot cover UE2.

2) SS Blocks in 5G

Figure 2:
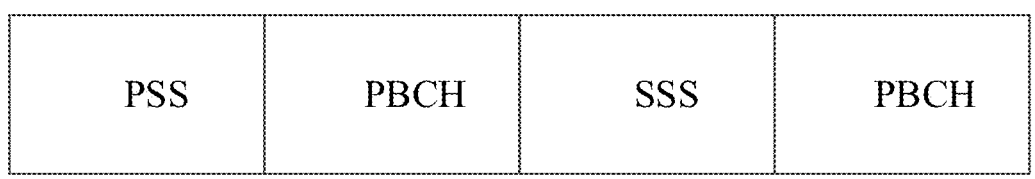
FIG. 2 is a schematic diagram of an SS block.

Common channels and common signals such as broadcast channels and synchronization signals in the 5G system need to cover the entire cell in a multi-beam scanning manner, so that UEs in the cell can receive these signals. For the synchronization signals, the transmission of the multi-beams is achieved by defining a Synchronization Signal burst set (SS burst set). One SS burst set includes one or more synchronization signal bursts (SS bursts), and one SS burst includes one or more SS blocks (also referred to as SSBs for short). One SS block is configured to carry the synchronization signal and the broadcast channel for one beam. Therefore, one SS burst set can include the synchronization signals for beams of which the number is equal to the number of the SS blocks within the range of the cell. As shown in FIG. 2, one SS block includes a Primary Synchronization Signal (PSS) of one symbol, a Secondary Synchronization Signal (SSS) of one symbol, and a Physical Broadcast Channel (PBCH) of two symbols.

The maximum number L of SS blocks included in one SS burst set is determined according to the frequency band of the system. For example:
for the frequency band of 3GHz, L is 4;
for the frequency band of 3GHz-6GHz, L is 8; and
for the frequency band of 6GHz-52.6GHz, L is 64.

Figure 3:
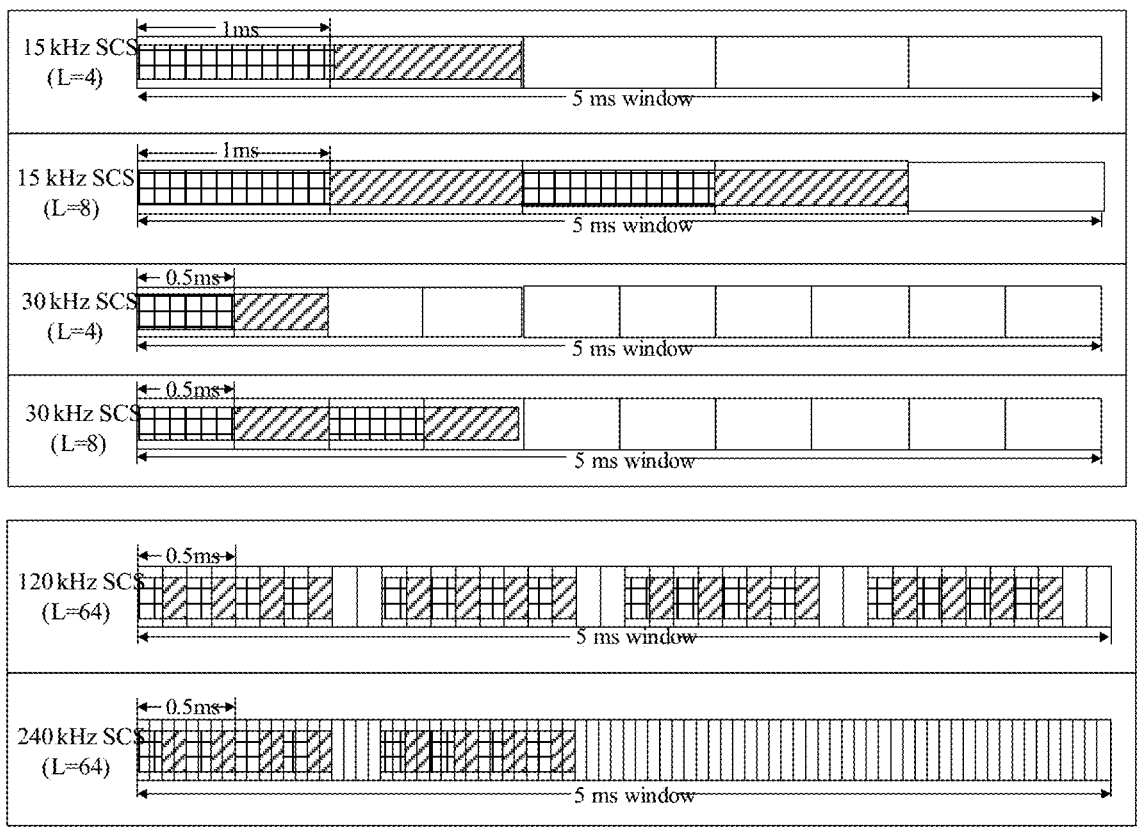
FIG. 3 is a diagram of distribution of slots in different subcarrier spacings and frequency bands.

For the SS burst set, the transmission cycle is configurable. In one example, the SS burst set in one cycle is transmitted within a time window of 5 ms. In addition, the subcarrier spacing (SCS) of the system can also be configurable. The distributions of slots in different subcarrier spacings and frequency bands are shown in FIG. 3. FIG. 3 schematically shows respectively, from top to bottom:
slot distribution of the SS burst set at 15 KHz SCS and L=4 (corresponding to the frequency band of 3 GHz);
slot distribution of the SS burst set at 15 KHz SCS and L=8 (corresponding to the frequency band of 3 GHz-6 GHz);
slot distribution of the SS burst set at 30 KHz SCS and L=4 (corresponding to the frequency band of 3 GHz);
slot distribution of the SS burst set at 30 KHz SCS and L=8 (corresponding to the frequency band of 3 GHz-6 GHz);
slot distribution of the SS burst set at 120 KHz SCS and L=64 (corresponding to the frequency band of 6 GHz-52.6 GHz);
Slot distribution of the SS burst set at 240 KHz SCS and L=64 (corresponding to the frequency band of 6 GHz-52.6 GHz).

Figure 4:
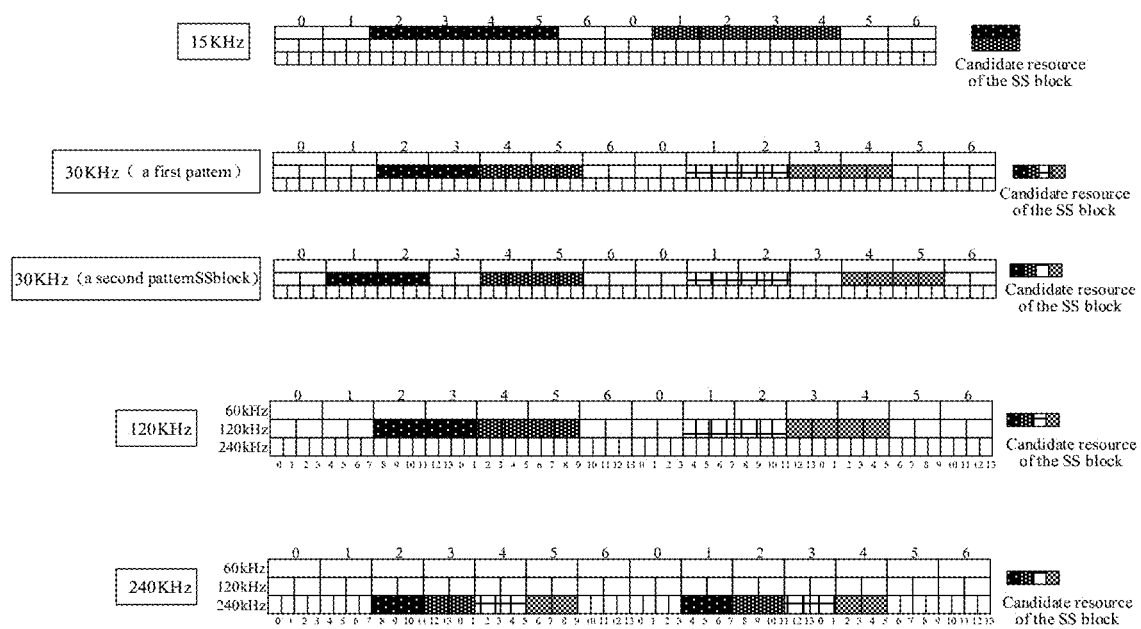
FIG. 4 is a diagram of distribution of SS blocks in different subcarrier spacings.

Further, for the distribution of the SS blocks within one slot, one slot includes 14 symbols, and can carry two SS blocks at most. The distributions of SS blocks at different subcarrier spacings are shown in FIG. 4. FIG. 4 schematically shows respectively, from top to bottom:
distribution of the SS blocks in one slot at 15 KHz SCS;
distribution I of the SS blocks in one slot at 30 KHz SCS;
distribution II of the SS blocks in one slot at 30 KHz SCS;
distribution of the SS blocks in one slot at 120 KHz SCS;
distribution of the SS blocks in one slot at 240 KHz SCS.

In the above solution, although the number L of the SS blocks is determined according to the frequency band of the system, L is only the maximum number of the SS blocks. The number of the SS blocks which are actually transmitted by the network may be less than L. The number of the SS blocks actually transmitted by the network may be indicated to the UE, so that the UE can perform rate matching, and locations of the time-frequency resources that do not transmit the SS block can be used for transmission of other channels, such as a Physical Downlink Shared Channel (PDSCH). Here, the information of the SS blocks actually transmitted by the network is indicated by Remaining Minimum System Information (RMSI).

Figure 5:
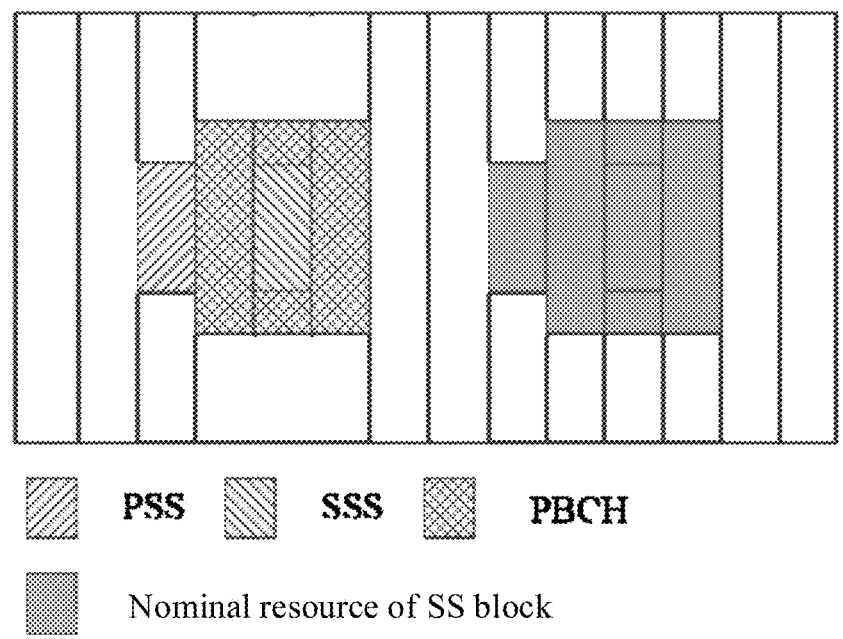
FIG. 5 is a diagram of position distribution of a predefined time-frequency resource where the SS block is located, in the slots.

The location distribution of the predefined time-frequency resources, in which the SS blocks are located, in the slot is shown in FIG. 5. However, due to the cycles of the SS blocks are different and the SS blocks which are actually transmitted are different, the SS blocks may not necessarily be transmitted on the predefined time-frequency resources, and thus these predefined time-frequency resources are referred to as nominal resources of the SS blocks.

3) Paging for LTE

In the LTE system, the network may transmit a paging message to a UE in the idle state and a UE in the connection state. The paging process can be triggered by a core network or the base station, and is configured to transmit a paging request to the UE in the idle state, or to notify the UE of updated system information, or to notify the UEs to receive information such as Earthquake and Tsunami Warning System (ETWS) information, Commercial Mobile Alert Service (CMAS) and the like. After receiving the paging message of the core network, the base station parses the paging message to obtain a Tracking Area identity list (TA list) of the UE, and performs an air interface paging on the cells of the tracking areas which belong to the TA list. Further, after receiving the paging message of the core network, the base station aggregates the paging messages with the same PO into one piece of paging message and transmits it to a relevant UE through a paging channel. The UE receives paging parameters through a system message, calculates the PO in conjunction with its own International Mobile Subscriber Identification Number (IMSI), and receives the paging message at the corresponding time according to the PO. Here, the paging message is carried by the PDSCH, and the UE obtains the paging indication information by detecting a Physical Downlink Control Channel (PDCCH) scrambled with P-RNTI, so as to receive the paging message in the PDSCH. Further, the UE in the idle state saves power in a DRX manner. The UE obtains DRX-related information from SIB2, and monitors the PDCCH scrambled with P-RNTI on the PO in the PF within one DRX cycle to receive the paging message.

Figure 6:
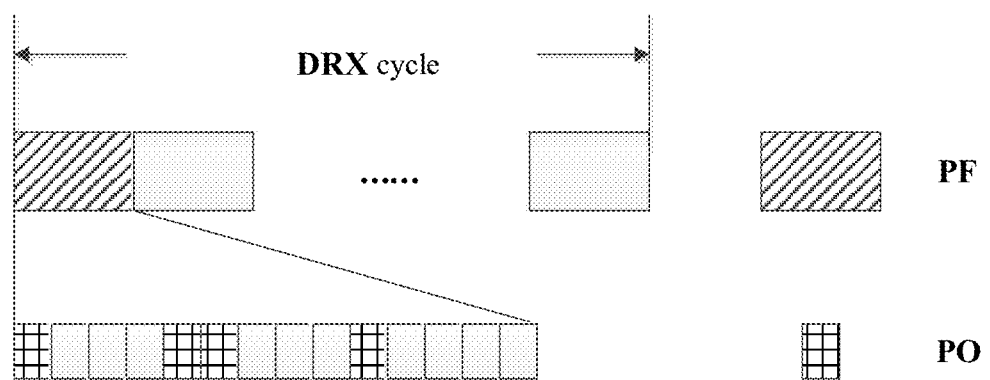
FIG. 6 is a diagram of distribution of a PF and a PO.

In the above solution, the PF indicates a System Frame Number (SFN) at which the paging message should appear, and the PO indicates a sub-frame time at which the paging message may appear. One PF frame may include one or more PO sub-frames. In each DRX cycle or paging cycle, the UE only needs to monitor the PO sub-frame belonging thereto. The distributions of the PF and the PO are shown in the FIG. 6. A frame with a SFN that satisfies the following formula can be used as one PF frame:

$$SFN \bmod T = (T \mathrm{div} N) \times (UE\_ID \bmod N)$$

where T represents a DRX cycle or a paging cycle of the UE. If a default paging cycle carried in SIB2 is noted as T_sib, if a DRX value T_ue of the UE has been configured, T=min (T_ue, T_sib) which represents a smaller value between T_ue and T_sib; and if T_ue is not configured, T=T_sib. UE_ID=(IMSI mod 1024), that is, all IMSIs are divided into 1024 groups of UEs. The IMSI is unique for each user. N=min (T, nB), which represents a smaller value between T and nB, where the parameter nB represents a density of the paging message. The nB is carried in SIB2, and the value range is {4T, 2T, T, T/2, T/4, T/8, T/16, T/32}, so the value range of N is {T, T/2, T/4, T/8, T/16, T/32}. Actually, N indicates how many PFs are included in each cycle.

The location of the PO sub-frame is determined by a LTE mode (FDD or TDD) and parameters Ns and i_s, where Ns represents how many paging sub-frames there are in each PF, i_s represents an index of the paging sub-frame, and Ns=max (1, nB/T), i_s=floor (UE_ID/N) mod Ns. As shown in Tables 1 and 2, Ns has only three values: 1, 2, and 4. For example, if the current mode is the LTE-FDD mode, Ns=4, and if i_s=0, PO=0 and the paging message will be transmitted in sub-frame 0; and if i_s=2, PO=5, and the paging message will be transmitted in sub-frame 5. Finally, the UE determines the position of the PO of its own within one cycle according to the POs in the cell and its UE ID. In this way, the UEs are evenly assigned to different POs.

TABLE 1

| | (FDD) | | | |
|---|---|---|---|---|
| Ns | PO (i_s = 0) | PO (i_s = 1) | PO (i_s = 2) | PO (i_s = 3) |
| 1 | 9 | N/A | N/A | N/A |
| 2 | 4 | 9 | N/A | N/A |
| 4 | 0 | 4 | 5 | 9 |

TABLE 2

| | (TDD) | | | |
|---|---|---|---|---|
| Ns | PO (i_s = 0) | PO (i_s = 1) | PO (i_s = 2) | PO (i_s = 3) |
| 1 | 0 | N/A | N/A | N/A |
| 2 | 0 | 5 | N/A | N/A |
| 4 | 0 | 1 | 5 | 6 |

4) Paging for 5G

Figure 7:
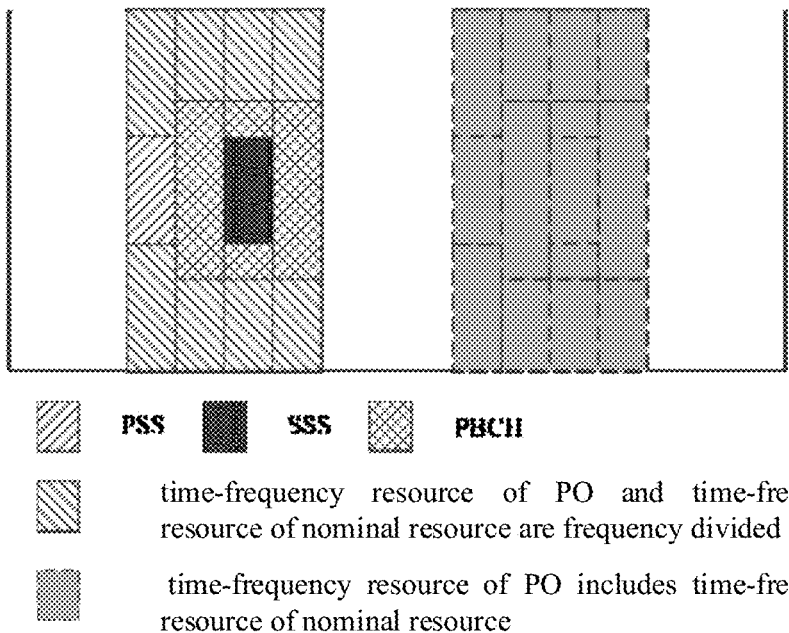
FIG. 7 is a diagram of distribution of the time-frequency resource of a PO.

In 5G, for definitions of time-frequency resources of a PO, one of them is to define that the nominal resources corresponding to the SS blocks are used as time-frequency resources carrying the paging message in the PO. As shown in FIG. 7, on the symbols of the nominal resource where the SS block is actually transmitted, the time-frequency resource corresponding to the PO and the time-frequency resource corresponding to the nominal resource are frequency divided. This type of time-frequency resource corresponding to the PO is referred to as a first type of time-frequency resource; on the symbols of the nominal resource where the SS block is not transmitted, the time-frequency resource corresponding to the PO may include the time-frequency resource corresponding to the nominal resource. This type of time-frequency resource corresponding to the PO is referred to as a second type of time-frequency resource.

For the two types of time-frequency resources of the PO in FIG. 7, due to different sizes of the time-frequency resources, the capabilities of carrying the paging messages thereof are also different. Especially, for the first type of time-frequency resource, because the time-frequency resource corresponding to the PO and the time-frequency resource corresponding to the nominal resource are frequency divided, and a total bandwidth is required to meet a minimum bandwidth capability of the UE, the bandwidth used for carrying the paging messages is very limited.

In actual deployment of the system, a paging time unit that the network may configure (such as the PO or a part of the time unit in the PO) includes a first type of paging time unit and a second type of paging time unit. When the time-frequency resource configured for carrying the paging message and the nominal resource of the SS block are frequency division multiplexed, the minimum bandwidth capability of the UE in the system may be exceeded, which may result in that the UE cannot receive the paging message. As such, for the two types of paging time units configured by the network, the first type of paging time unit must be excluded.

The technical solutions of embodiments of the present disclosure are described below with reference to specific embodiments.

Figure 8:
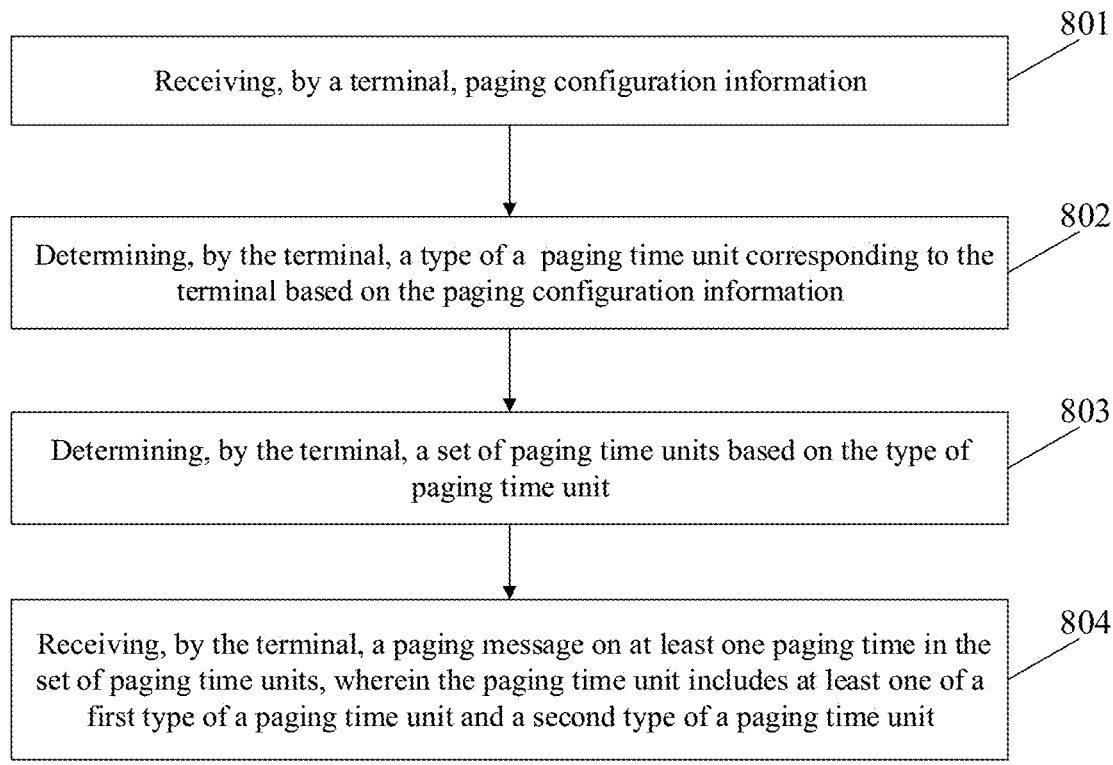
FIG. 8 is a first schematic flowchart diagram of a method for determining paging time in an embodiment of the present disclosure.

FIG. 8 is a first schematic flowchart diagram of a method for determining paging time in an embodiment of the present disclosure. As shown in FIG. 8, the method for determining the paging time includes the following steps.

In step 801, a terminal receives paging configuration information.

In the embodiment of the present disclosure, the terminal receives the paging configuration information sent by the network.

In step , the terminal determines a type of a paging time unit corresponding to the terminal based on the paging configuration information.

In the embodiment of the present disclosure, the terminal determining the type of the paging time unit corresponding to the terminal according to the paging configuration information may be implemented by, but not limited to, the following manners:

In a first manner, the terminal obtains time-frequency resource information corresponding to the paging message from the paging configuration information; and the terminal determines the type of the paging time unit corresponding to the terminal based on at least one of the time-frequency resource information corresponding to the paging message, time-frequency resource information of an SS block, or preset bandwidth information.

For the first manner, determining the type of the paging time unit corresponding to the terminal includes:

1) the terminal determining that the type of paging time unit corresponding to the terminal is the first type of the paging time unit or the second type of the paging time unit based on at least one of the time-frequency resource information corresponding to the paging message, the time-frequency resource information of the SS block, or the preset bandwidth information.

2) the terminal determining that the type of the paging time unit corresponding to the terminal is the first type of the paging time unit and the second type of the paging time unit based on at least one of the time-frequency resource information corresponding to the paging message, the time-frequency resource information of the SS block, or the preset bandwidth information.

For example, in a case where the time-frequency resource corresponding to the paging message and the nominal resource of the SS block are the frequency division multiplexed, the terminal determines bandwidth information corresponding to the paging message and the SS block based on the time-frequency resource information corresponding to the paging message and the time-frequency resource information of the SS block; the terminal compares the bandwidth information corresponding to the paging message and the SS block with preset bandwidth information; if the bandwidth information corresponding to the paging message and the SS block is greater than the preset bandwidth information, it is determined that the type of the paging time unit corresponding to the terminal is the second type of the paging time unit; and if the bandwidth information corresponding to the paging message and the SS block is less than or equal to the preset bandwidth information, it is determined that the type of the paging time unit corresponding to the terminal is the first type of the paging time unit and the second type of the paging time unit.

In another example, in a case where the time-frequency resource corresponding to the paging message includes the time-frequency resource of the nominal resource (the SS block is not transmitted on this nominal resource), the terminal compares the bandwidth information corresponding to the paging message with the preset bandwidth information; if the bandwidth information corresponding to the paging message is greater than the preset bandwidth information, it is determined that the type of the paging time unit corresponding to the terminal is the second type of the paging time unit; and if the bandwidth information corresponding to the paging message is less than or equal to the preset bandwidth information, it is determined that the type of the paging time unit corresponding to the terminal is the first type of the paging time unit and the second type of the paging time unit.

In another example, in a case where the time-frequency resource corresponding to the paging message and the nominal resource (the SS block may be or may be not transmitted on this nominal resource) are time division multiplexed, the terminal compares the bandwidth information corresponding to the paging message with the preset bandwidth information; if the bandwidth information corresponding to the paging message is greater than the preset bandwidth information, it is determined that the type of the paging time unit corresponding to the terminal is the second type of the paging time unit; and if the bandwidth information corresponding to the paging message is less than or equal to the preset bandwidth information, it is determined that the type of the paging time unit corresponding to the terminal is the first type of the paging time unit and the second type of the paging time unit.

In the above solutions, the preset bandwidth information is minimum bandwidth information of the terminal, or the preset bandwidth information is bandwidth information corresponding to the terminal.

Herein, different terminals in the system respectively correspond to respective bandwidth capabilities (i.e., the bandwidth information). Among all the bandwidth information, there is minimum bandwidth information. That is, the bandwidth information of all the terminals in the system is greater than or equal to the minimum bandwidth information. For example, a terminal 1 corresponds to a bandwidth 1, a terminal 2 corresponds to a bandwidth 2, and a terminal 3 corresponds to a bandwidth 3. The bandwidth 1, the bandwidth 2 and the bandwidth 3 are different bandwidths, and all the three bandwidths are greater than or equal to the minimum bandwidth. It can be seen that the minimum bandwidth information of the terminals refers to the minimum bandwidth information corresponding to the system. In an application, the bandwidth information of each terminal can be obtained on the network side.

In a second manner, the terminal obtains paging indication information from the paging configuration information; and the terminal determines the type of the paging time unit corresponding to the terminal based on the paging indication information.

For the second manner, determining the type of the paging time unit corresponding to the terminal includes:

1) the terminal determining that the type of the paging time unit corresponding to the terminal is the first type of the paging time unit or the second type of the paging time unit according to the paging indication information, or 2) the terminal determining that the type of the paging time unit corresponding to the terminal is the first type of the paging time unit and the second type of the paging time unit according to the paging indication information.

In the above solutions, the terminal can directly determine the type of the paging time unit based on the indication from the network side.

In an embodiment, the paging indication information includes the type of the paging time unit corresponding to the terminal.

In another embodiment, the paging indication information includes the type of the paging time unit that is needed to be excluded by the terminal.

In an example where the paging time unit is the PO, the paging indication information is configured to indicate that the terminal corresponds to the second type of PO, or the paging indication information is configured to indicate that the terminal needs to exclude the first type of PO. Regardless of the specific indication method, the terminal can determine the type of the paging time unit corresponding to the terminal by the paging indication information, that is, the terminal corresponds to the second type of PO.

In another example where the paging time unit is the PO, the paging indication information is configured to indicate that the terminal corresponds to the first type of PO and the second type of PO, or the paging indication information is configured to indicate that the terminal does not need to exclude any type of PO. Regardless of the specific indication method, the terminal can determine the type of the paging time unit corresponding to the terminal by the paging indication information, that is, the terminal corresponds to the first type of PO and the second type of PO.

In step 803, the terminal determines a set of paging time units based on the type of the paging time unit.

In the embodiment of the present disclosure, the first type of paging time unit corresponds to a first type of time-frequency resource, and the second type of paging time unit corresponds to a second type of time-frequency resource.

In the above solutions, the first type of time-frequency resource and the second type of time-frequency resource have the following relationship:
1) a size of the time-frequency resource corresponding to the first type of time-frequency resource is different from a size of a time-frequency resource corresponding to the second type of time-frequency resource;
2) a multiplexing manner for the first type of time-frequency resource and the time-frequency resource of the SS block is different from a multiplexing manner for the second type of time-frequency resource and the time-frequency resource of the SS block; or
3) the size of the time-frequency resource corresponding to the first type of time-frequency resource is different from the size of the time-frequency resource corresponding to the second type of time-frequency resource, and the multiplexing manner for the first type of time-frequency resource and the time-frequency resource of the SS block is different from the multiplexing manner for the second type of time-frequency resource and the time-frequency resource of the SS block, Further, the first type of the paging time unit being corresponding to the first type of time-frequency resource includes that:

on symbols of a nominal resource for SS block transmission, the time-frequency resource corresponding to the first type of paging time unit and the nominal resource are frequency divided.

The second type of paging time unit being corresponding to the second type of time-frequency resource includes that:

on symbols of a nominal resource which is not for SS block transmission, the time-frequency resource corresponding to the second type of paging time unit includes the time-frequency resource of the nominal resource.

The second type of paging time unit being corresponding to the second type of time-frequency resource includes that:

the time-frequency resource corresponding to the second type of paging time unit and the nominal resource are time divided.

In the above solution, the paging time unit includes the PO, or a part of time units in the PO.

It can be seen that, when the first type of paging time unit and the nominal resource of the SS block are frequency division multiplexed, the preset bandwidth information may be exceeded (such as the minimum bandwidth information of the terminal, which may result in that the UE cannot receive the paging message). As such, the first type of paging time unit can be excluded. That is, the terminal only needs to use the set of second type of paging time units as candidate paging time units. Herein, the terminal determines a location of a paging time unit corresponding to itself among the candidate paging time units, and receives the paging message at this location of the paging time unit.

Of course, if the preset bandwidth information is not exceeded (such as the minimum bandwidth information of the terminal), the set of the first type of paging time units and the set of the second type of paging time units can be used as the candidate paging time units. Herein, the terminal determines the location of the paging time unit corresponding to itself among the candidate paging time units, and receives the paging message at this location of the paging time unit.

In step 804, the terminal receives a paging message on at least one paging time unit in the set of paging time units; wherein the paging time unit include at least one of a first type of a paging time unit and a second type of a paging time unit.

In a specific application, after determining the set of paging time units, the terminal determines the location of the paging time unit (such as the PO) at which it receives the paging message according to its UE_ID, and receives the paging message at the determined location of the paging time.

Figure 9:
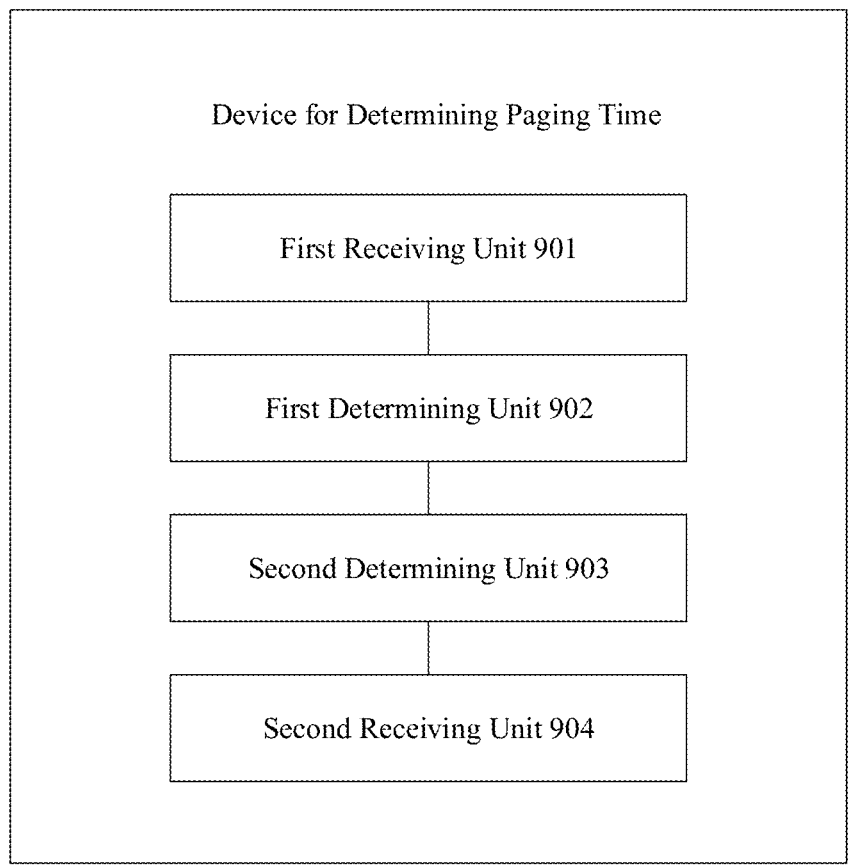
FIG. 9 is a first schematic structural composition diagram of a device for determining paging time in an embodiment of the present disclosure.

FIG. 9 is a first schematic structural composition diagram of a device for determining paging time in an embodiment of the present disclosure. As shown in FIG. 9, the device for determining the paging time includes:

a first receiving unit 901, configured to receive paging configuration information;

a first determining unit 902, configured to determine a type of a paging time unit corresponding to the terminal based on the paging configuration information;

a second determining unit 903, configured to determine a set of paging time units based on the type of the paging time unit; and a second receiving unit 904, configured to receive a paging message on at least one paging time unit in the set of paging time units, where the paging time unit includes at least one of a first type of a paging time unit and a second type of a paging time unit.

In an embodiment, the first determining unit 902 is configured to obtain time-frequency resource information corresponding to the paging message from the paging configuration information; and determine the type of the paging time unit corresponding to the terminal based on at least one of the time-frequency resource information corresponding to the paging message, time-frequency resource information of an SS block, or preset bandwidth information.

In an embodiment, the first determining unit 902 is configured to obtain paging indication information from the paging configuration information; and determine the type of the paging time unit corresponding to the terminal based on the paging indication information.

In an embodiment, the first determining unit 902 is configured to determine, based on at least one of the time-frequency resource information corresponding to the paging message, the time-frequency resource information of the SS block, or the preset bandwidth information, that the type of the paging time unit corresponding to the terminal is the first type of the paging time unit or the second type of the paging time unit; or determine, based on at least one of the time-frequency resource information corresponding to the paging message, the time-frequency resource information of the SS block, or the preset bandwidth information, that the type of the paging time unit corresponding to the terminal is the first type of the paging time unit and the second type of the paging time unit.

In an embodiment, the preset bandwidth information is minimum bandwidth information of the terminal; or the preset bandwidth information is bandwidth information corresponding to the terminal.

In an embodiment, the first determining unit 902 is configured to determine, based on the paging indication information, that the type of the paging time unit corresponding to the terminal is the first type of the paging time unit or the second type of the paging time unit; or determine, based on the paging indication information, that the type of the paging time unit corresponding to the terminal is the first type of the paging time unit and the second type of the paging time unit.

In an embodiment, the first type of the paging time unit corresponds to a first type of time-frequency resource, and the second type of the paging time unit corresponds to a second type of time-frequency resource.

In an embodiment, a size of a time-frequency resource corresponding to the first type of time-frequency resource is different from a size of a time-frequency resource corresponding to the second type of time-frequency resource; and/or, a multiplexing manner for the first type of time-frequency resource and a time-frequency resource of the SS block is different from a multiplexing manner for the second type of time-frequency resource and the time-frequency resource of the SS block.

In an embodiment, the first type of the paging time unit being corresponding to the first type of time-frequency resource includes:

on symbols of a nominal resource for SS block transmission, the time-frequency resource corresponding to the first type of the paging time unit and the nominal resource are frequency divided.

In an embodiment, the second type of the paging time unit being corresponding to the second type of time-frequency resource includes:

on symbols of a nominal resource which is not for SS block transmission, the time-frequency resource corresponding to the second type of the paging time unit includes the time-frequency resource of the nominal resource.

In an embodiment, the second type of the paging time unit being corresponding to the second type of time-frequency resource includes that:

the time-frequency resource corresponding to the second type of the paging time unit and the nominal resource are time divided.

In an embodiment, the paging time unit includes the PO or a part of time units in the PO.

Those skilled in the art should understand that the functions implemented by the respective units in the device for determining the paging time shown in FIG. 9 can be understood by referring to the related description of the foregoing method for determining the paging time. The functions of the respective units in the device for determining the paging time shown in FIG. 9 may be implemented by a program running on a processor, or may be implemented by a specific logic circuit.

Figure 10:
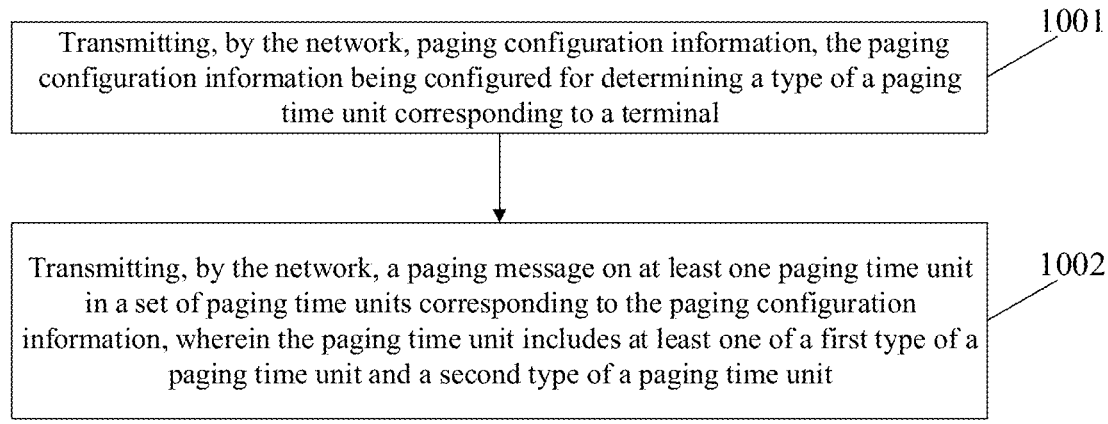
FIG. 10 is a second schematic flowchart diagram of a method for determining paging time in an embodiment of the present disclosure.

FIG. 10 is a second schematic flowchart diagram of a method for determining a paging time in an embodiment of the present disclosure. As shown in FIG. 10, the method for determining the paging time includes the following steps.

In step 1001, a network transmits paging configuration information, the paging configuration information being configured for determining a type of a paging time unit corresponding to a terminal.

In an embodiment, the paging configuration information includes time-frequency resource information corresponding to the paging message.

In this way, the terminal can obtain the time-frequency resource information corresponding to the paging message from the paging configuration information; and determines the type of the paging time unit corresponding to the terminal based on at least one of the time-frequency resource information corresponding to the paging message, time-frequency resource information of an SS block, or preset bandwidth information.

In another embodiment, the paging configuration information includes paging indication information.

In this way, the terminal may obtain the paging indication information from the paging configuration information; and determines the type of the paging time unit corresponding to the terminal according to the paging indication information.

In the above solutions, the first type of the paging time unit corresponds to a first type of time-frequency resource, and the second type of the paging time unit corresponds to a second type of time-frequency resource.

Further, a size of the time-frequency resource corresponding to the first type of time-frequency resource is different from the size of the time-frequency resource corresponding to the second type of time-frequency resource; and/or, a multiplexing manner for the first type of time-frequency resource and a time-frequency resource of the SS block is different from a multiplexing manner for the second type of time-frequency resource and the time-frequency resource of the SS block.

In the above solutions, the first type of the paging time unit being corresponding to the first type of time-frequency resource includes that:

on symbols of a nominal resource for SS block transmission, the time-frequency resource corresponding to the first type of the paging time unit and the nominal resource are frequency divided.

In the above solutions, the second type of the paging time unit being corresponding to the second type of time-frequency resource includes that:

on symbols of a nominal resource which is not for SS block transmission, the time-frequency resource corresponding to the second type of the paging time unit includes the time-frequency resource of the nominal resource.

In the above solutions, the second type of the paging time unit being corresponding to the second type of time-frequency resource type includes that:

the time-frequency resource corresponding to the second type of the paging time unit and the nominal resource are time divided.

In the above solutions, the paging time unit includes the PO or a part of time units in the PO.

In step 1002, the network transmits a paging message on at least one paging time unit in a set of paging time units corresponding to the paging configuration information, where the paging time unit includes at least one of a first type of a paging time unit and a second type of a paging time unit.

Those skilled in the art should understand that the paging configuration information on the network side corresponds to the paging configuration information on the terminal side.

Figure 11:
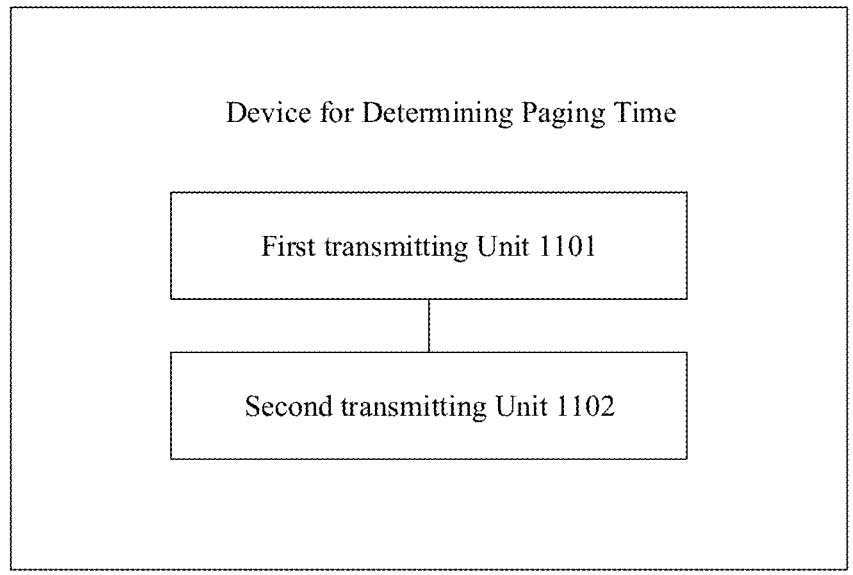
FIG. 11 is a second schematic structural composition diagram of a device for determining paging time in an embodiment of the present disclosure.

FIG. 11 is a second schematic structural composition diagram of a device for determining paging time in an embodiment of the present disclosure. As shown in FIG. 11, the device includes:

a first transmitting unit 1101, configured to transmit paging configuration information, the paging configuration information being configured to determine a type of a paging time unit corresponding to a terminal; and a second transmitting unit 1102, configured to transmit a paging message on at least one paging time unit in a set of paging time units corresponding to the paging configuration information;

where the paging time unit includes at least one of a first type of a paging time unit and a second type of a paging time unit.

In an embodiment, the paging configuration information includes time-frequency resource information corresponding to the paging message.

In an embodiment, the paging configuration information includes paging indication information.

In an embodiment, the first type of the paging time unit corresponds to a first type of time-frequency resource, and the second type of the paging time unit corresponds to a second type of time-frequency resource.

In an embodiment, a size of a time-frequency resource corresponding to the first type of time-frequency resource is different from a size of a time-frequency resource corresponding to a second type of time-frequency resource; and/or, a multiplexing manner for the first type of time-frequency resource and a time-frequency resource of the SS block is different from a multiplexing manner for the second type of time-frequency resource and the time-frequency resource of the SS block.

In an embodiment, the first type of the paging time unit being corresponding to the first type of time-frequency resource includes that:

on symbols of a nominal resource for SS block transmission, the time-frequency resource corresponding to the first type of the paging time unit and the nominal resource are frequency divided.

In an embodiment, the second type of the paging time unit being corresponding to the second type of time-frequency resource includes that:

on symbols of a nominal resource which is not for SS block transmission, the time-frequency resource corresponding to the second type of the paging time unit includes the time-frequency resource of the nominal resource.

In an embodiment, the second type of the paging time unit being corresponding to the second type of time-frequency resource includes that:

the time-frequency resource corresponding to the second type of the paging time unit and the nominal resource are time divided.

In an embodiment, the paging time unit includes PO or a part of time units in the PO.

When the foregoing device for determining the paging time in the embodiment of the present disclosure is implemented in a form of a software functional module and sold or used as an independent product, it may also be stored in a computer-readable storage medium. Based on such an understanding, the technical solution of the embodiment of the present disclosure essentially or a part thereof that contributes to the existing technology may be embodied in a form of a software product. The computer software product is stored in a storage medium and includes pieces of instructions for causing a computer device (which may be a personal computer, a server, a network device, or the like) to perform all or part of the methods described in the embodiments of the present disclosure. The foregoing storage medium includes various media that can store program codes, such as a USB disk, a mobile hard disk, a Read Only Memory (ROM), a magnetic disk, or an optical disk. In this way, the embodiments of the present disclosure are not limited to any specific combination of hardware and software.

Accordingly, an embodiment of the present disclosure further provides a computer storage medium in which computer-executable instructions are stored. When the computer-executable instructions are executed by a processor, the method for determining the paging time according to the embodiments of the present disclosure is implemented.

Figure 12:
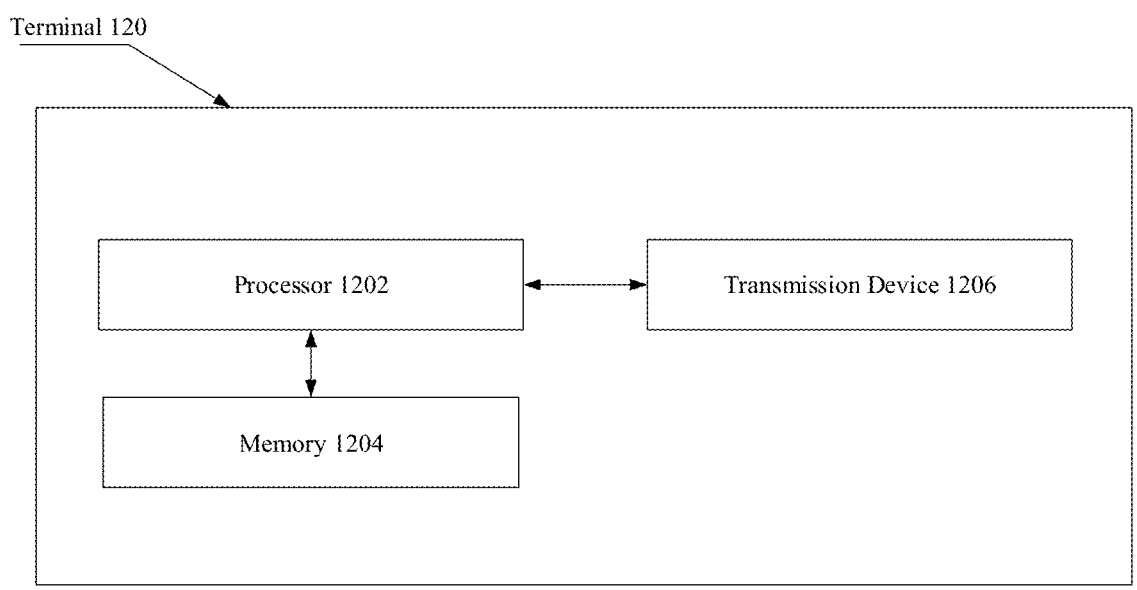
FIG. 12 is a schematic structural composition diagram of a terminal in an embodiment of the present disclosure.

FIG. 12 is a schematic structural composition diagram of a terminal in an embodiment of the present disclosure. As shown in FIG. 12, a terminal 120 can include one or more (only one is shown in the figure) processors 1202 (the processors 1202 may include, but is not limited to, a processing device such as a Micro Controller Unit (MCU) or a Field Programmable Gate Array (FPGA)), a memory 1204 for storing data, and a transmission device 1206 for communication functions. A person of ordinary skill in the art can understand that the structure shown in FIG. 12 is only for illustration, and does not limit the structure of the electronic device. For example, the terminal 120 may further include more or fewer components than those shown in FIG. 12, or have a different configuration from that shown in FIG. 12.

The memory 1204 may be configured to store software programs and modules of application software, such as program instructions/modules corresponding to the method for determining the paging time in the embodiments of the present disclosure. The processor 1202 executes the software programs and modules stored in the memory 1204, thereby performing various functional applications and data processing, that is, implementing the method described above. The memory 1204 may include a high-speed random access memory, and may further include a non-volatile memory, such as one or more magnetic storage devices, a flash memory, or other non-volatile solid-state memories. In some examples, the memory 1204 may further include memories which is set remotely with respect to the processor 1202, and these remote memories may be connected to the terminal 120 through a network. Examples of the above network include, but are not limited to, an Internet, a corporate intranet, a local area network, a mobile communication network, and a combination thereof.

The transmission device 1206 is configured to receive or transmit data via the network. The specific examples of the above network may include a wireless network provided by a communication provider of the terminal 120. In one example, the transmission device 1206 includes a Network Interface Controller (NIC), which can be connected to other network devices through a base station so as to perform communication with the Internet. In one example, the transmission device 1206 may be a Radio Frequency (RF) module, which is configured to communicate with the Internet in a wireless manner.

In the technical solutions of the embodiments of the present disclosure, the terminal receives the paging configuration information; the terminal determines the type of paging time unit corresponding to the terminal based on the paging configuration information; the terminal determines the set of paging time units according to the type of paging time unit; and the terminal receives the paging message on at least one paging time unit in the set of paging time units; wherein, the paging time unit includes at least one of the first type of paging time unit and the second type of paging time unit. With the technical solutions of the embodiments of the present disclosure, when paging configuration on the network side changes, the UE can be informed of the set of paging time units available within the cell in time, so that the paging resource can be flexibly configured on the network side.

The technical solutions described in the embodiments of the present disclosure can be arbitrarily combined if they do not conflict.

In the embodiments provided in the present disclosure, it should be understood that the method and smart device disclosed may be implemented in other ways. The embodiments of the device described above are merely illustrative. For example, the division of the units is only a logical function division. In practice, there may be other manners of division. For example, multiple units or components may be combined or integrated into another system, or some features may be ignored or not performed. In addition, coupling, direct coupling or communication connection among the illustrated or discussed components may be indirect coupling or communication connection through some interfaces, devices or units, or may be in electrical, mechanical or other forms.

The units described as separated parts above may or may not be physically separated, and the parts shown as units may or may not be physical units, that is, they may be located in one place, or may be distributed over multiple network units. Some or all of the units may be selected according to actual requirements to achieve the objectives of the solutions in the embodiments.

In addition, the respective functional units in each of the embodiments of the present disclosure may be integrated into a second processing unit, or each of the units may be separately used as one unit, or two or more units may be integrated into one unit. The above integrated units may be implemented in the form of hardware, or may be implemented in the form of hardware plus software functional units.

Those described above are merely specific embodiments of the present disclosure, and the protection scope of the present disclosure is not limited thereto. Any person skilled in the art can easily think of changes or substitutions within the technical scope disclosed in the present disclosure, and all the changes or substitutions should be within the protection scope of the present disclosure.

What is claimed is:

1. A method for determining paging time, comprising:
   receiving, by a terminal, paging configuration information;
   determining, by the terminal, at least one type of at least one paging time unit corresponding to the terminal based on the paging configuration information;
   determining, by the terminal, a set of paging time units based on the at least one type of the at least one paging time unit; and
   receiving, by the terminal, a paging message on at least one paging time unit in the set of paging time units,
   wherein, one or more paging time units comprise at least one of a first type of a paging time unit or a second type of a paging time unit,
   the first type of the paging time unit corresponds to a first type of time-frequency resource for paging in 5G, and the second type of the paging time unit corresponds to a second type of time-frequency resource for paging in 5G,
   a size of a time-frequency resource corresponding to the first type of time-frequency resource is a first size, a size of a time-frequency resource corresponding to the second type of time-frequency resource is a second size, and the first size is smaller than the second size, and
   wherein the at least one paging time unit comprises a part of time units in a paging occasion (PO).

2. The method of claim 1, wherein the determining, by the terminal, the at least one type of the at least one paging time unit corresponding to the terminal based on the paging configuration information comprises:
   obtaining, by the terminal, time-frequency resource information corresponding to the paging message from the paging configuration information; and
   determining, by the terminal, the at least one type of the at least one paging time unit corresponding to the terminal based on at least one of: the time-frequency resource information corresponding to the paging message, time-frequency resource information of a Synchronization Signal (SS) block, or preset bandwidth information.

3. The method of claim 1, wherein the determining, by the terminal, the at least one type of the at least one paging time unit corresponding to the terminal based on the paging configuration information comprises:
   obtaining, by the terminal, paging indication information from the paging configuration information; and
   determining, by the terminal, the at least one type of the at least one paging time unit corresponding to the terminal based on the paging indication information.

4. The method of claim 2, wherein the determining, by the terminal, the at least one type of the at least one paging time unit corresponding to the terminal based on at least one of the time-frequency resource information corresponding to the paging message, the time-frequency resource information of the SS block, or the preset bandwidth information comprises:
   determining, by the terminal based on at least one of the time-frequency resource information corresponding to the paging message, the time-frequency resource information of the SS block, or the preset bandwidth information, that the at least one type of the at least one paging time unit corresponding to the terminal is the first type of the paging time unit or the second type of the paging time unit;
   or,
   determining, by the terminal based on at least one of the time-frequency resource information corresponding to the paging message, the time-frequency resource information of the SS block, or the preset bandwidth information, that the at least one type of the at least one paging time unit corresponding to the terminal is the first type of the paging time unit and the second type of the paging time unit.

5. The method of claim 3, wherein the determining, by the terminal, the at least one type of the at least one paging time units corresponding to the terminal based on the paging indication information comprises:
   determining, by the terminal based on the paging indication information, that the at least one type of the at least one paging time unit corresponding to the terminal is the first type of the paging time unit or the second type of the paging time unit; or
   determining, by the terminal based on the paging indication information, that the at least one type of the at least one paging time unit corresponding to the terminal is the first type of the paging time unit and the second type of the paging time unit.

6. The method of claim 1, wherein a multiplexing manner for the first type of time-frequency resource and a time-frequency resource of an SS block is different from a multiplexing manner for the second type of time-frequency resource and the time-frequency resource of the SS block.

7. A method for determining paging time, comprising:
   transmitting, by a network, paging configuration information, the paging configuration information being configured for determining at least one type of at least one paging time unit corresponding to a terminal; and
   transmitting, by the network, a paging message on at least one paging time unit in a set of paging time units corresponding to the paging configuration information,
   wherein, one or more paging time units comprise at least one of a first type of a paging time unit or a second type of a paging time unit, the first type of the paging time unit corresponds to a first type of time-frequency resource for paging in 5G, and the second type of the paging time unit is corresponding to a second type of time-frequency resource for paging in 5G, a size of a time-frequency resource corresponding to the first type of time-frequency resource is a first size, a size of a time-frequency resource corresponding to the second type of time-frequency resource is a second size, and the first size is smaller than the second size, and wherein the at least one paging time unit comprises a part of time units in a paging occasion (PO).

8. The method of claim 7, wherein the paging configuration information comprises time-frequency resource information corresponding to the paging message.

9. The method of claim 7, wherein the paging configuration information comprises paging indication information.

10. The method of claim 7, wherein a multiplexing manner for the first type of time-frequency resource and a time-frequency resource of an SS block is different from a multiplexing manner for the second type of time-frequency resource and the time-frequency resource of the SS block.

11. A terminal device, comprising:
a processor; and
a memory for storing instructions executable by the processor, wherein when the instructions are executed by the processor, the terminal device is configured to:
receive paging configuration information;
determine at least one type of at least one paging time unit corresponding to the terminal based on the paging configuration information;
determine a set of paging time units based on the at least one type of the at least one paging time unit; and
receive a paging message on at least one paging time unit in the set of paging time units,
wherein, one or more paging time units comprise at least one of a first type of a paging time unit and a second type of a paging time unit,
the first type of the paging time unit corresponds to a first type of time-frequency resource for paging in 5G, and the second type of the paging time unit corresponds to a second type of time-frequency resource for paging in 5G,
a size of a time-frequency resource corresponding to the first type of time-frequency resource is a first size, is different from a size of a time-frequency resource corresponding to the second type of time-frequency resource is a second size, and the first size is smaller than the second size, and
wherein the at least one paging time unit comprises a part of time units in a paging occasion (PO).

12. The terminal device of claim 11, wherein the terminal device is further configured to obtain time-frequency resource information corresponding to the paging message from the paging configuration information; and determine the at least one type of the at least one paging time unit corresponding to the terminal based on at least one of: the time-frequency resource information corresponding to the paging message, time-frequency resource information of an SS block, or preset bandwidth information.

13. The terminal device of claim 11, wherein the terminal device is further configured to obtain paging indication information from the paging configuration information; and determine the at least one type of the at least one paging time unit corresponding to the terminal based on the paging indication information.

14. The terminal device of claim 12, wherein the terminal device is further configured to determine, based on at least one of the time-frequency resource information corresponding to the paging message, the time-frequency resource information of the SS block, or the preset bandwidth information, that the at least one type of the at least one paging time unit corresponding to the terminal is the first type of the paging time unit or the second type of the paging time unit; or determine, based on at least one of the time-frequency resource information corresponding to the paging message, the time-frequency resource information of the SS block, or the preset bandwidth information, that the at least one type of the at least one paging time unit corresponding to the terminal is the first type of the paging time unit and the second type of the paging time unit.

15. The terminal device of claim 13, wherein the terminal device is further configured to determine, based on the paging indication information, that the at least one type of the at least one paging time unit corresponding to the terminal is the first type of the paging time unit or the second type of the paging time unit; or determine, based on the paging indication information, that the at least one type of the at least one paging time unit corresponding to the terminal is the first type of the paging time unit and the second type of the paging time unit.

16. The terminal device of claim 11, wherein a multiplexing manner for the first type of time-frequency resource and a time-frequency resource of an SS block is different from a multiplexing manner for the second type of time-frequency resource and the time-frequency resource of the SS block.

17. A network device, comprising:
a processor; and
a memory for storing instructions executable by the processor, wherein when the instructions are executed by the processor, the network device is configured to:
transmit paging configuration information, the paging configuration information being configured for determining at least one type of at least one paging time unit corresponding to a terminal; and
transmit a paging message on at least one paging time unit in a set of paging time units corresponding to the paging configuration information,
wherein, one or more paging time unit comprise at least one of a first type of a paging time unit and a second type of a paging time unit,
the first type of the paging time unit corresponds to a first type of time-frequency resource for paging in 5G, and the second type of the paging time unit corresponds to a second type of time-frequency resource for paging in 5G,
a size of a time-frequency resource corresponding to the first type of time-frequency resource is a first size, is different from a size of a time-frequency resource corresponding to the second type of time-frequency resource is a second size, and the first size is smaller than the second size, and
wherein the at least one paging time unit comprises a part of time units in a paging occasion (PO).

18. The network device of claim 17, wherein the paging configuration information comprises time-frequency resource information corresponding to the paging message.

19. The network device of claim 17, wherein the paging configuration information comprises paging indication information.

20. The network device of claim 17, wherein a multiplexing manner for the first type of time-frequency resource and a time-frequency resource of an SS block is different from a multiplexing manner for the second type of time-frequency resource and the time-frequency resource of the SS block.

* * * * *